United States Patent [19]

Przybyla et al.

[11] 4,118,544

[45] Oct. 3, 1978

[54] METAL-AIR DEPOLARIZED CELL HAVING RESTRICTED GAS PASSAGEWAY

[75] Inventors: Franciszek J. Przybyla; Michael J. Smith, both of Mississauga, Canada

[73] Assignee: P.R. Mallory & Co. Inc., Indianapolis, Ind.

[21] Appl. No.: 837,477

[22] Filed: Sep. 28, 1977

[51] Int. Cl.$^2$ .................................... H01M 12/06
[52] U.S. Cl. ......................... 429/27; 429/162; 29/623.1
[58] Field of Search ............ 429/27, 34, 38, 39, 429/72, 162, 72; 29/623.1

[56] References Cited

U.S. PATENT DOCUMENTS

| | | | |
|---|---|---|---|
| 3,746,580 | 7/1973 | Aker et al. | 429/27 |
| 3,840,404 | 10/1974 | Porter et al. | 429/27 |
| 3,855,000 | 12/1974 | Jammet | 429/27 |
| 3,881,959 | 5/1975 | Tsuchido et al. | 429/27 |

Primary Examiner—Anthony Skapars
Attorney, Agent, or Firm—Ronald S. Cornell; Israel Nissenbaum; Charles W. Hoffmann

[57] ABSTRACT

A gas-depolarizable galvanic cell is provided having restricted gas access to the cathode. The cell is generally a metal-air cell, and may particularly be a button cell suitable for use in electronic watches, hearing aids and the like. The restricted gas access to the cathode comes either by way of a very small aperture in the cell container, or in an additional barrier layer placed within the cell. The cross-sectional area of the gas passageway is less than the projected area of the gas passageway through the thickness of the container or additional barrier layer; and may be formed by piercing or punching but more particularly by exposing the container or the material of the additional barrier layer to a laser beam.

10 Claims, 1 Drawing Figure

METAL-AIR DEPOLARIZED CELL HAVING RESTRICTED GAS PASSAGEWAY

FIELD OF THE INVENTION

This invention relates to gas-depolarizable galvanic cells, and more particularly to gas-depolarizable galvanic cells having alkaline electrolytes and gas communication from the gas-depolarizable cathode of the cell to the exterior of the cell. The present invention provides that the gas-depolarizable galvanic cell has a restricted gas flow past a barrier which is in the path of gas communication to the cathode; and is particularly adapted for metal-air (especially zinc-air) cells of the sort which are used in low rate, steady current applications but where occasional high current rate for very short periods of time may be required.

BACKGROUND OF THE INVENTION

The concept of gas-depolarized galvanic or electrochemical cells is well known. In such cells, there is an anode and a gas-depolarizable cathode, usually having an electrolyte carrying separator disposed between the anode and cathode, and having some means whereby there is gas communication between the gas-depolarizable cathode and the ambient. Such means include gas communication passageways through the container of the cell. Frequently, the depolarizing gas is oxygen from the ambient air; and most often the metal used in metal-air cells is zinc, but cadmium, iron or other metals may also be used.

In any event, metal-air cells have a higher energy density than the usual "dry" cells or other primary cells such as zinc/manganese dioxide or zinc/mercuric oxide cells; and in the most common instance, zinc-air cells may have three times or more the energy density of such other cells.

Likewise, there are a number of applications for gas-depolarizable galvanic cells such as zinc-air cells where it is desired to operate the cell in such a manner as to draw current from it at very low steady current rates, with occasional very short high current requirements. Some such applications may include hearing aids and the like, but particularly such applications for zinc-air cells according to the present invention are contemplated as electronic watches, calculators and the like. Electronic watches may include analog watches which generally have a steady current draw but which may require an intermittent higher current to drive a wheel or disc upon which a day/date display is shown; and more particularly, electronic watches include LED (light emitting diode) or LCD (liquid crystal display) watches, which have very low current draw during normal operation to drive the watch module, and as well for LED watches or calculators to power the constant liquid crystal display — such current draws being only in the order of microamperes — but where occasional high current rate for a very short period of time may be required such as to illuminate the LED display or to power a back light for an LCD display. However, for tritium oxide LCD backlight, such higher current pulses are not required.

In general, it is desirable to restrict the gas flow communication to the gas-depolarizable cathode of the cell — the air or oxygen cathode — thereby restricting water vapour and oxygen access or egress from the cell, and in some instances to control the limiting current which may be drawn from the cell at its rated terminal voltage.

It is particularly to be noted that a major consideration is to assure that there is a long operating life for a zinc-air cell or the like in such low rate applications with occasional high rate, short term current draw as discussed above; and that such assurance of long operating life may be particularly attained by precluding either moisture loss from the alkaline electrolyte of the cell in low relative humidity ambient conditions, or excessive water vapour absorption by the alkaline electrolyte of the cell at high relative humidity ambient conditions. Obviously, if the alkaline electrolyte is permitted to lose its moisture content and therefore to dry out, the cell may self-discharge or otherwise become inoperable because of internal short circuits or other damage; whereas, if there is too much water vapour influx and absorption by the electrolyte, the physical dimensions of the cell may be altered in that it may be caused to bulge and thereby to leak electrolyte from the cell or again to cause other damage — and in any event, in such applications as electronic watches a physical dimensional change of the cells installed in the watch cannot usually be accommodated except within very narrow limit of tolerance.

In all events, there is also the possibility that where there is substantially unrestricted air access to the interior of the cell, there may be some carbon dioxide absorption by the alkaline electrolyte, thereby decreasing the energy capacity and power output capability of the cell.

Thus, the present invention provides for the physical interposition of a non-porous barrier in the path of gas communication to the cathode of the cell — where the barrier may be the cell container or it may be an additional element placed within the cell — and where the gas passageway through the barrier has a restricted area such as to restrict gas flow rate to the cathode; and because, in general, the present invention is particularly adapted to button cells for use in electronic watches and the like, this invention provides that the total cross-sectional area of the gas passageway through the barrier perpendicular to the direction of gas flow therethrough is not greater than the total projected area of the gas passageway through the thickness of the barrier. It will be recognized that, in general, it is not possible to punch, pierce or drill holes, or to form slits, through non-porous material — especially sheet metal or metal foil — where the width or diameter of the aperture or slit is less than the thickness of the thin material. Where a very thin foil or plastics material may be used, it may be possible to form slits or to pierce or punch apertures therethrough having a diameter or width which is approximately equal to the thickness of the material; but where metal sheet, for example, is used as in cell containers, it is not possible to place a very restricted aperture through the metal sheeting using ordinary manufacturing techniques. Accordingly, it is a feature of the present invention that, especially where an aperture is formed in the cell container, that aperture may be formed by exposing the portion of the cell container or the metal from which it is to be made where the aperture is to be formed to a laser beam or to a chemical etching process, whereby a very small but well controlled aperture may be formed. The manufacturing process may also include forming apertures in sheet metal by laser drilling or chemical etching techniques; and thereafter forming the cathode container by punching and drawing a blank from the metal sheeting where an aperture has been made.

Therefore, it is possible by this invention to provide low rate, special purpose metal-air alkaline electrolyte cells using ordinary components which might otherwise be used for high rate cells, merely by altering or adding one or more additional manufacturing steps during the assembly of such a cell to obtain the desired low rate cell having restricted gas flow communication to the cathode thereof.

What the present invention provides, therefore, is means whereby special purpose cells may be provided using ordinary cell components with the simple provision of a very restricted gas passageway through a barrier which is interposed in the path of gas communication from the ambient of the cell to the cathode thereof. Excessive moisture vapour influx or egress to or from the cell, respectively, depending upon the relative humidity of the ambient in which the cell is operating, is thereby assured.

There is, of course, some accumulation of oxygen within the interior of the cell during normal low rate operation thereof, particularly within the air diffusion layer or region of the cell, such that there is sufficient excess depolarizing gas within the cell to permit short term, high current rate draw therefrom.

It should be noted, of course, that the present invention is not restricted to button cells, and may be applicable to larger cylindrical cells. In such circumstances, however, there may be a plurality of very fine gas passageways formed through the cell container and/or a separate barrier placed within the cell, within the teachings of the present invention, and thereby providing controlled gas access to the cathode of the cell. Likewise, it is clear that the present invention is not restricted to zinc-air cells, but such cells are the most common gas-depolarizable galvanic cell which would be found in low rate applications of the sort discussed above.

BRIEF SUMMARY OF THE INVENTION

The principal object of this invention is to provide a gas-depolarizable cell having very restricted gas access to the cathode of the cell.

A principal feature of the present invention is that a gas-depolarizable cell according hereto, and having a restricted gas passageway interposed in the path of gas communication to the cathode, may have such restricted gas passageway whose cross-sectional area is considerably less — or in any event not greater — than the projected lengthwise of the area of the gas passageway through the thickness of the barrier in which it is formed.

Thus, it follows that a corollary of the above feature is that special manufacturing techniques may be required to produce a cell according to the present invention, especially if the restricted gas passageway is formed in the cell container; and such special manufacturing techniques may include the provision of laser drilling or exposure of the cell container to a laser beam, or the use of chemical etching techniques, so as to form the restricted gas passageway.

A further object of this invention is that any gas-depolarizable cell according hereto may be made using standard cell components, with the requirement only of one or several simple additional manufacturing steps and/or the provision of an additional element within the cell, but otherwise using standard components and techniques.

BRIEF DESCRIPTION OF THE DRAWING

These and other features and objects of the invention are described and discussed in greater detail hereafter, in association with the accompanying drawing which includes a single FIGURE, for exemplary purposes only and for purposes of illustration of the principles of the invention, wherein:

The single FIGURE of drawings is a partial cross-section of a typical gas-depolarizable galvanic cell — in this case, a button cell — showing the principal components thereof and the application of the present invention thereto.

DESCRIPTION OF THE PREFERRED EMBODIMENTS

Figure 1:
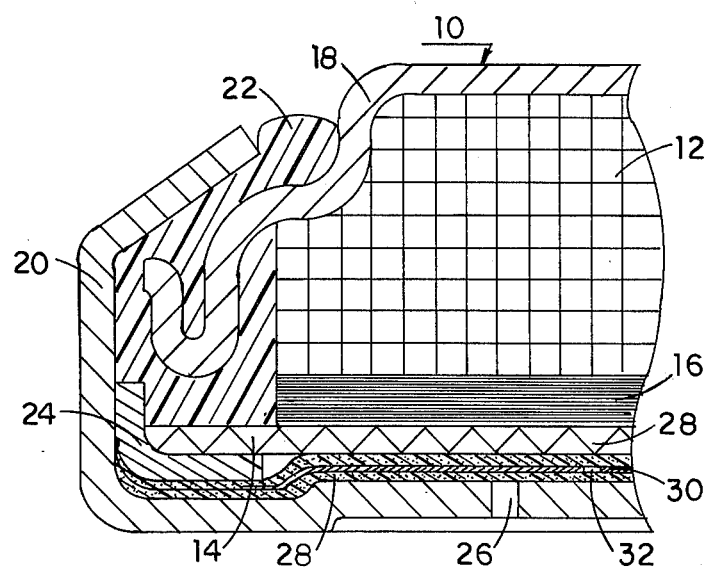

As previously stated, this invention provides a gas-depolarizable galvanic cell, and is particularly applicable to metal-air cells — the most common of which is a zinc-air cell — where the anode may comprise zinc, amalgamated zinc, zinc-cadmium, etc., and where the anode may be gelled or porous such as compressed powder or the like. As noted, this invention is applicable either to button-type cells or cylindrical cells, and provides that there is placed, in the path of gas communication from the ambient in which the cell is operating to the cathode, a non-porous barrier having a restricted gas passageway therethrough. Thus, undesirable water vapour access or egress to or from the cell is precluded, and in certain circumstances, current limiting with respect to the cell operation may be accommodated.

It has been found, for example, a 45% potassium hydroxide alkaline electrolyte establishes a relatively low water vapour pressure inside a cell. If unrestricted gas flow communication is permitted to a cell having such an electrolyte, and the cell is operating at very low current rate, it is possible in high ambient relative humidity conditions for there to be too much water vapour access to the interior of the cell, where it is absorbed with the possibility of damage to the cell such as by causing it to bulge or to leak electrolyte. Likewise, in low relative humidity ambient conditions, there may be a water vapour egress from the cell, and in such circumstances, the dried-out cell may self-discharge or be otherwise inoperable.

In any event, as noted above, the present invention precludes the difficulties referred to by providing for restricted gas and water vapour access to the gas-depolarizable cathode of the cell. As noted, the present invention is applicable both to button-type cells and cylindrical cells, and is described hereafter, for purposes of explanation, with respect to a typical button cell.

Referring to the single FIGURE of drawings, there is shown a typical button cell 10, having an anode 12, a gas-depolarizable cathode 14 and an electrolyte carrying separator 16 disposed between the anode 12 and the cathode 14. The container for the cell comprises an anode container/terminal 18 and a cathode container/terminal 20 which are electrically insulated from each other by an insulating gasket 22. The anode 12 is electrically associated with the anode container 18, and the gas-depolarizable cathode 14 is electrically associated with the cathode container 20. A cathode ring 24 may be disposed within the cathode container 20 together with the gas-depolarizable cathode 14; and a layer 28 of polytetrafluoroethylene or other microporous material may be disposed at the bottom of the cathode container 20.

The present invention provides that there is placed, in the path of gas communication to the cathode 14, a non-porous barrier having gas passageway therethrough which comprises at least one aperture through the non-porous barrier from one side to the other thereof. As previously noted, the non-porous barrier may be the cathode container 20, or it may be an additional element or barrier layer 30 which is placed within the cell on the side of the cathode 14 which is remote from the separator 16.

Referring first to the circumstance where there is no additional non-porous barrier layer 30 within the cell, the restricted gas passageway from the ambient within which the cell operates to the cathode 14 is through at least one opening or aperture 26 which is formed in the cathode container 20. The total cross-sectional area of the aperture 26 — or apertures if there are more than one — when taken perpendicularly to the direction of gas flow through said aperture 26, is not greater than the total projected area of the gas passageway through the aperture 26 measured through the thickness of the cathode container 20.

Thus, for example, the thickness of the cathode container or cathode terminal portion 20 of the cell container, at the place where the gas passageway or aperture 26 is formed, may be from 0.007 to 0.025 inches. The aperture 26 may be a slit, but more generally is a hole which is formed in the material of the cathode container 20, and may have a diameter — assuming the aperture to be round or substantially round — of from 0.001 to 0.002 inches. Thus, the cross-sectional area of the aperture 26, even when the aperture may be a very thin slit, would not generally be greater than approximately 0.0001 square inches. Assuming a thickness of 0.007 inches and a diameter of 0.002 inches, it will be seen that the projected area through the thickness of the cell container would be 0.000014 square inches or more.

Obviously, when the cathode container 20 of the cell 10 — whether it is a button cell or a cylindrical cell — is made of sheet metal such as stainless steel, nickel or nickel plated steel, ordinary manufacturing techniques such as piercing, punching or drilling will not permit formation of an aperture whose cross-sectional area is less than its projected area through the thickness of the material. As a rule of thumb, the least diameter of an aperture which may be formed using conventional techniques through sheet metal — even having a thickness of as little as 0.007 inches — is at least equal to the thickness of the material. Where the diameter or width of an aperture formed through such sheet metal is to be only a fraction of the thickness of the material, other techniques must be used. It has been found that exposing the cathode container to a suitable laser beam has been very successful in forming such restricted apertures as are required for purposes of the present invention — and that such apertures meet the limitations stated above, namely that the cross-sectional area of the aperture thus formed is not greater than the projected area through the thickness of the cathode container material in which the aperture is formed.

The cell — especially a button cell — may be completely assembled, or at least the cathode assembly may be formed, before the aperture is made in the cathode container by exposure thereof to a laser beam. The layer 28 of microporous material is essentially transparent to a laser beam, and with proper adjustment of the beam the energy thereof can be controlled so as not to penetrate through to the anode terminal. Thus, a nearly infinite shelf life of a metal-air cell may be assumed until the air access aperture is formed.

Turning now to the circumstances where there is an additional barrier layer element 30 placed within the cell at the side of the cathode 14 remote from the separator 16, it is necessary that there still be one or more apertures or openings 26 through the cell container; but in these circumstances, the opening or openings 26 may be formed using conventional methods because the restricted gas passageway which is placed in the path of gas communication to the cathode 14 is formed through the additional barrier layer 30.

The barrier layer 30 may be placed as one lamina of a plurality of layers of microporous material. One practical embodiment has one or more layers of microporous material 28 in the bottom of the cathode container 20, then a non-porous barrier layer 30, then one or more additional microporous layers 28 which provide a gas diffusion layer within which an excess of oxygen greater than required for the normal low current drain requirements on the cell may accumulate, at least to some extent.

The non-porous barrier layer 30 may be chosen from the group comprising metal sheeting, metal foil, non-porous plastic membranes, metallized plastic membranes, plastic coated metals, and combinations thereof; and in particular, the non-porous barrier layer 30 may be formed from alkali resistant metal sheeting or foil such as stainless steel or nickel sheeting or foil, or alkali resistant polymers such as polyethylene, polypropylene, polyvinylchloride or polyamides.

In general, in the case of a button cell, it is not anticipated that the thickness of a layer of non-porous material would be any less than 0.001 or 0.003 inches, because any such material having a thickness less than that stated would be extremely difficult to handle even in fully automated production. However, with very thin foil or plastics materials, it may be possible to pierce or punch restricted gas passageway apertures 32 through such material, as well as to form the very restricted apertures by such means as electro-discharge machining, laser drilling, or chemical etching.

It will be seen that, during normal low current rate discharge of the cell, there will be an excess of oxygen accumulated within the gas diffusion layer 28 in the cell. Thus, when there is a requirement for a short term high current rate discharge from the cell — such as when an LED display or an LCD back light are to be illuminated — there is sufficient depolarizing gas to provide the short term current requirement of the cell.

It should be noted that when the cell is such as a zinc-air cell, oxygen is the depolarizing gas which is active in the cathode material. However, oxygen is only a constituent of the ambient air which also includes nitrogen, carbon dioxide and water vapour, and therefore those other gases are also drawn into the interior of the cell. As noted above, one purpose for restriction of gas access to the cathode is to preclude an excessive influx or egress of water vapour to or from the cell. It is postulated that, in any event, there is a partial vacuum created within the cell as oxygen is utilized during the electro-chemical process of depolarization of the cathode, and that such partial vacuum which is thus created draws more air into the cell. Water vapour may diffuse outwardly from the cell if the water vapour partial pressure within the cell exceeds that outside the cell, or the water vapour may be absorbed by the electrolyte if the water vapour paetial pressure within the cell is less than that outside the cell.

There has been described a gas depolarizable galvanic cell with restricted gas and water vapour access to the cathode — and likewise with restricted water vapour egress from the cell — where a very restricted gas passageway is interposed in the path of gas communication from the ambient in which the cell is operating to the cathode thereof. The restricted gas passageway is formed in a non-porous barrier placed within the path of gas communication, and is such that the cross-sectional area of such passageway perpendicular to the direction of gas flow through the passageway is less than or at least not greater than the projected area of the gas passageway through the thickness of the non-porous barrier. It has been noted that the barrier may be the cathode container of the cell, or an independent barrier element placed within the cell between the air cathode and the cell wall. Likewise, a number of different materials have been mentioned as exemplary of such materials, and combinations thereof, which are suitable for an independent or additional non-porous barrier layer. It has been noted that, in general, ordinary piercing and punching techniques are not suitable for forming the restricted gas passageways contemplated by this invention, especially when the gas passageways are formed within the cell container itself; and that in such circumstances, laser drilling by exposure of the cell container to a suitable laser beam or chemical etching have been found to be satisfactory. In that manner, an aperture having a width or diameter considerably less than the thickness of the material in which it is formed, is possible to be obtained.

It has been noted that, with the exception of the formation and interposition of the restricted gas passageway in the path of gas communication to the cathode, and the additional manufacturing steps to form the passageway and/or to place it within the cell with an additional barrier layer, the remaining cell components do not require special handling or working and may be used in common with cell components intended for high rate applications. It has been noted that, because moisture and water vapour access to an egress from the cell is restricted, the usable life of the cell is prolonged; and that because, during normal low current rate operation of the cell, there is an accomulation of excess oxygen within the air diffusion layer of the cell, it is possible for the cell to provide short term high current rate demand.

Obviously, therefore, the principles of the invention have been exemplified above, without restriction, and those principles, materials and assemblies may otherwise be employed or disposed without departing from the spirit and scope of the accompanying claims.

The embodiments of the invention in which an exclusive property or privilege is claimed are defined as follows:

1. In a gas-depolarizable galvanic cell having an anode, a gas-depolarizable cathode, an electrolyte carrying separator therebetween, and a container for said cell having negative and positive terminals electrically insulated from each other and electrically associated with said anode and cathode, respectively, and where there is at least one opening in said container for gas communication from the exterior of the cell to said gas-depolarizable cathode, the improvement wherein:

there is placed in the path of said gas communication to said cathode, a non-porous barrier having gas passageway comprising at least one aperture therethrough from one side to the other thereof; and where the total crosssectional area perpendicular to the direction of gas flow of said gas passageway is not greater than the total projected area of the gas passageway through the thickness of said non-porous barrier.

2. The combination of claim 1 where said barrier is the cathode terminal portion of said container.

3. The combination of claim 1 where said barrier is chosen from the group comprising metal sheeting, metal foil, non-porous plastic membranes, metallized plastic membranes, plastic coated metal foil, plastic coated metal sheeting, and combinations thereof, having said gas passageway therethrough, and being disposed within said cathode terminal portion of said container on the side of said cathode remote from said electrolyte carrying separator.

4. The combination of claim 3 where said barrier is chosen from the group comprising alkali resistant metal sheeting, alkali resistant metal foils, alkali resistant polymers, and combinations thereof.

5. The combination of claim 2 where said cell is a button cell and said at least one gas passageway aperture in said cathode terminal portion of said cell container is formed therein by chemical etching or by exposing said cathode container to a laser beam.

6. The combination of claim 3 where said at least one gas passageway aperture in said barrier is formed therein by piercing, punching, chemical etching, or exposing said barrier to a laser beam.

7. The combination of claim 1 where the metal in said anode is zinc or amalgamated zinc.

8. A method of producing a gas-depolarizable galvanic cell having an anode, a gas-depolarizable cathode, an electrolyte carrying separator therebetween, and a container for said cell having negative and positive terminals electrically insulated from each other and electrically associated with said anode and cathode, respectively, and where there is at least one opening in said container for gas communication from the exterior of the cell to said gas-depolarizable cathode; where said cell is a button cell and said at least one opening in said container is formed in the cathode terminal portion thereof and has a cross-sectional area perpendicular to its longitudinal axis which is not greater than the projected area of said aperture through the thickness of said container; including the step of:

exposing said cathode terminal portion of said container to a laser beam so as to form said at least one aperture therein.

9. A method of producing a gas-depolarizable galvanic cell having an anode, a gas-depolarizable cathode, an electrolyte carrying separator therebetween, and a container for said cell having negative and positive terminals electrically insulated from each other and electrically associated with said anode and cathode, respectively, and where there is at least one opening in said container for gas communication from the exterior of the cell to said gas-depolarizable cathode; where said cell is a button cell and said at least one opening in said container is formed in the cathode terminal portion thereof and has a cross-sectional area perpendicular to its longitudinal axis which is not greater than the projected area of said aperture through the thickness of said container; including the steps of:

forming at least one aperture in a sheet of suitable cathode container metal by laser beam, drilling or chemical etching techniques; and thereafter forming said cathode container by punching and drawing a portion of said sheet of metal wherein said at least one aperture has been made.

10. A method of activating a gas-depolarizable galvanic cell having an anode, a gas-depolarizable cathode, an electrolyte carrying separator therebetween, and a container for said cell having negative and positive terminals electrically insulated from each other and electrically associated with said anode and cathode, respectively, and where the cell has been assembled and completely sealed against gas communication from the exterior of the cell to said gas-depolarizable cathode by exposing said cathode terminal portion of said container of said sealed cell to a laser beam so as to form at least one aperture therein, and thereby to permit gas communication through said at least one formed aperture from the exterior of said cell to said gas-depolarizable cathode.

* * * * *